US012621707B2

(12) United States Patent
Sridhar et al.

(10) Patent No.: US 12,621,707 B2
(45) Date of Patent: May 5, 2026

(54) ALLOCATING RADIO ACCESS NETWORK RESOURCES BASED ON PREDICTED VIDEO ENCODING RATES

(71) Applicant: Nokia Technologies Oy, Espoo (FI)

(72) Inventors: Kamakshi Sridhar, Plano, TX (US); Edward A. Grinshpun, Freehold, NJ (US); Chuck Payette, Oceanport, NJ (US)

(73) Assignee: Nokia Technologies Oy, Espoo (FI)

( * ) Notice: Subject to any disclaimer, the term of this patent is extended or adjusted under 35 U.S.C. 154(b) by 178 days.

(21) Appl. No.: 17/040,905

(22) PCT Filed: Mar. 23, 2018

(86) PCT No.: PCT/US2018/023969
§ 371 (c)(1),
(2) Date: Sep. 23, 2020

(87) PCT Pub. No.: WO2019/182605
PCT Pub. Date: Sep. 26, 2019

(65) Prior Publication Data
US 2021/0014725 A1 Jan. 14, 2021

(51) Int. Cl.
*H04W 28/02* (2009.01)
*H04N 19/159* (2014.01)

(52) U.S. Cl.
CPC ...... *H04W 28/0284* (2013.01); *H04N 19/159* (2014.11)

(58) Field of Classification Search
CPC ......... H04W 28/0289; H04W 28/0284; H04W 72/085; H04N 19/159

(Continued)

(56) References Cited

U.S. PATENT DOCUMENTS 9,780,997 B2 10/2017 Grinshpun et al.
9,794,825 B2 10/2017 Grinshpun et al.
(Continued)

FOREIGN PATENT DOCUMENTS

CN       1155225 A    7/1997
EP       1357758 A2 * 10/2003 ............. G06T 9/005
WO   WO 2014/078744 A2   5/2014

OTHER PUBLICATIONS

Zhang et al. Channel-Adaptive ResourceAllocationforScalableVid eoTransmissionOver3GWirelessNetwork,Aug. 1, 2004, IEEE l,US,vol. 14,No. 8, pp. 1049-1063.*

(Continued)

*Primary Examiner* — Kwang B Yao
*Assistant Examiner* — Syed M Bokhari
(74) *Attorney, Agent, or Firm* — Tong, Rea, Bentley & Kim, LLC

(57) ABSTRACT

Methods, apparatuses, and systems are described for allowing a radio access network to infer information about conversational video traffic without requiring signaling mechanisms that allow communication with conversational video applications. Methods, apparatuses, and systems described herein allow radio access network equipment to detect conversational video traffic, collect information about the conversational video traffic and as well as other network conditions, predict delays associated with the conversational video traffic, predict a likely encoding rate that will be used by the application that generates the conversational video traffic, and/or allocate resources to the conversational video traffic based on the likely encoding rates and/or other network conditions.

15 Claims, 8 Drawing Sheets

(58) Field of Classification Search
USPC ........................................................ 370/329
See application file for complete search history.

(56) References Cited

U.S. PATENT DOCUMENTS

| 2008/0225949 | A1* | 9/2008 | Adachi ................ H04N 19/503 |
| | | | 375/E7.129 |
| 2010/0011118 | A1* | 1/2010 | Chang ..................... H04L 47/70 |
| | | | 709/235 |
| 2012/0051326 | A1* | 3/2012 | Yokota ................ H04W 36/005 |
| | | | 455/525 |
| 2013/0042275 | A1 | 2/2013 | Payette et al. |
| 2013/0042276 | A1 | 2/2013 | Payette et al. |
| 2017/0149860 | A1* | 5/2017 | Ben Eli .................... H04L 65/65 |
| 2017/0367004 | A1* | 12/2017 | Yoon ................. H04W 28/0231 |
| 2018/0063202 | A1* | 3/2018 | Dhanabalan .......... H04L 65/612 |
| 2018/0063555 | A1* | 3/2018 | Raduchel ................ G06F 9/452 |

OTHER PUBLICATIONS

Zhangetal, Channel-Adaptive Resource Allocation for Scalable Video Transmission Over 3GWireless Network, Aug. 1, 2004, IEEE l,US,vol. 14, No. 8, pp. 1049-1063 (Year: 2004).*

International Search Report and Written Opinion mailed in corresponding PCT/US2018/023969 on Oct. 18, 2018, 17 pages.

Zhang, Q., et al., "Channel-Adaptive Resource Allocation for Scalable Video Transmission Over 3G Wireless Network," IEEE Transactions on Circuits and Systems for Video Technology, vol. 14, No. 8, Aug. 2004, 15 pages.

Nokia, "End-to-End signaling of QoS parameters for IMS multimedia sessions in CS-IMS combinational services (CSICS)," 3GPP Draft; S4-050341_SCI_Signaling, $3^{rd}$ Generation Partnership Project (3GPP), vol. SA WG4, May 2005, 4 pages.

Intel Corporation, "Solution Details on Awareness of Critical Data," 3GPP Draft; R2-1712617, 3GPP TSG RAN WG2, Nov. 2017, 4 pages.

Holmer, S., et al., "A Google Congestion Control Algorithm for Real-Time Communication," draft-ietf-rmcat-gcc-02, Network Working Group, Jul. 8, 2016, 19 pages.

First Office Action, Chinese Patent Application No. 201880091718. 2, Sep. 22, 2023, 6 pages.

Second Office Action, Chinese Application No. 201880091718.2, Mar. 12, 2024; pp. (4).

Intention to Grant for corresponding EP Application No. 18 717 777.9-1215, dated Oct. 21, 2024, 9 pages.

Bakhshi, et al., "On Internet Traffic Classification: A Two-Phased Machine Learning Approach," Journal of Computer Networks and Communications, Jun. 6, 2016, 21 pages.

ITU-T, "Parametric bitstream-based quality assessment of progressive download and adaptive audiovisual streaming services over reliable transport—Quality integration module," ITU-T, Series P: Telephone Transmission Quality, Telephone Installations, Local Line Networks: Models and tools for quality assessment of streamed media, p. 1203.3, Dec. 2016, 22 pages.

* cited by examiner

ALLOCATING RADIO ACCESS NETWORK RESOURCES BASED ON PREDICTED VIDEO ENCODING RATES

CROSS-REFERENCE TO RELATED APPLICATIONS

The present application is a 371 application of PCT Patent Application Serial No. PCT/US2018/023969, entitled "ALLOCATING RADIO ACCESS NETWORK RESOURCES BASED ON PREDICTED VIDEO ENCODING RATES", and filed on Mar. 23, 2018, the entirety of which is incorporated by reference herein.

BACKGROUND

In recent years, wireless and other networks have been serving increasing traffic from smartphones and other devices. A growing portion of this traffic includes bidirectional video (e.g., conversational video) and other multimedia data flows that are latency-sensitive. Techniques for allocating sufficient network resources to this latency-sensitive traffic to-date have often been ineffective or difficult to implement.

SUMMARY

The following summary is not intended to identify key or critical elements of the disclosure nor to delineate the scope of the disclosure. The following summary merely presents some concepts of the disclosure in a simplified form as a prelude to the description below.

Methods, apparatuses, and systems for improving quality of service for such latency-sensitive traffic are described herein. Many different applications may generate conversational video and other latency-sensitive traffic. Wireless radio access networks (RANs) typically handle conversational video traffic in the same way as traffic that is not latency-sensitive (e.g., using best effort delivery). Because such conversational video traffic is often encrypted, the RAN may not know whether traffic is conversational video or some other type of traffic, and thus may not be able to optimally allocate resources to conversational video traffic in order to improve quality of service for that traffic. Without some signaling mechanism that would allow a particular application generating conversational video traffic (or other such latency-sensitive traffic) to notify the RAN that the traffic is latency-sensitive, the RAN may have no way to distinguish between latency-sensitive and other traffic. Adopting a signaling standard for communicating between conversational video applications and RANs would be difficult due to the large number of such applications, the various technologies used by different RANs, and other factors.

Conversational video applications running on user equipment typically set an encoding rate, which determines the data throughput, based on the end-end delay for prior packets in the conversational video session. A first user equipment sends out packets to a second user equipment and vice versa, and as the second user equipment receives packets, it will send out receiver reports on periodic intervals to the first user equipment, and vice versa. The periodicity may vary for different applications and may not be standardized. When the first user equipment, for example, receives these reports, it will decide the encoding rate for subsequent time intervals. If a reported end-to-end delay is high, the conversational video application on the user equipment may lower its encoding rates in order to avoid losing packets due to network congestion. If the reported end-to-end delay is low, the conversational video application on the user equipment may raise its encoding rates in order to provide better quality video.

Because of the periodicity of the reporting and the iterative adjustment process, encoding rates may be adjusted gradually over time. Because of the lack of signaling mechanisms, the RAN may be unaware of the upcoming encoding rate changes, which may prevent it from taking any preemptive action to ensure better quality of service for the adjusted video traffic.

Methods, apparatuses, and systems described herein allow a RAN to infer information about conversational video traffic without requiring signaling mechanisms that allow communication with conversational video applications. Methods, apparatuses, and systems described herein allow RAN equipment to detect conversational video traffic, collect information about the conversational video traffic and as well as other network conditions, predict delays associated with the conversational video traffic, predict a likely encoding rate that will be used by the application that generates the conversational video traffic, and allocate resources to the conversational video traffic based on the likely encoding rates and other network conditions.

BRIEF DESCRIPTION OF THE DRAWINGS

The present disclosure is accompanied by figures in which like reference numerals indicate similar elements and in which.

DETAILED DESCRIPTION

In the following description, reference is made to the accompanying drawings, which form a part hereof. It is to be understood that structural and functional modifications may be made without departing from the scope of the present disclosure.

Figure 1:
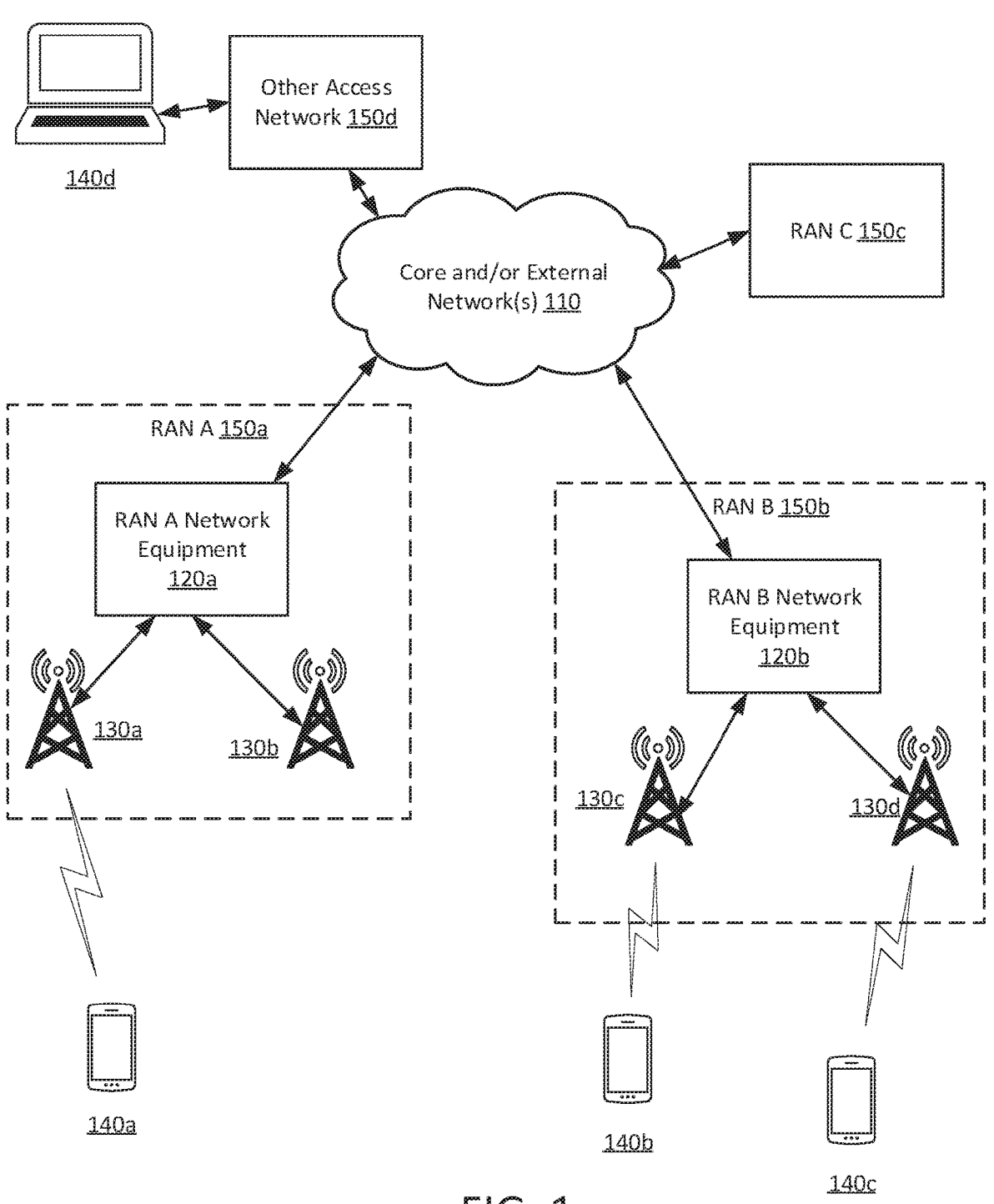
FIG. 1 illustrates a network environment including user equipment connected via wireless radio access networks and other networks.

FIG. 1 illustrates a network environment including user equipment connected via wireless radio access networks and other networks. User equipment may connect to other user equipment via one or more access networks 150, which in turn may be connected to each other via one or more core and/or external networks 110. The user equipment may thus establish multimedia data flows (e.g., bidirectional video sessions) that may, in some cases, be routed through one or more radio access networks.

User equipment 140 may include, as illustrated, smartphones (e.g., 140a-c) and/or personal computers (e.g., 140d) and/or any other type of user equipment. For example, user equipment may include tablets, desktop computers, laptop computers, gaming devices, virtual reality (VR) headsets, other mobile devices, or other user equipment.

Multimedia data flows may include bidirectional video data flows associated with data traffic from a conversational video application (e.g., SKYPE, FACETIME, etc.) or other types of multimedia data flows that are latency-sensitive. Such latency-sensitive multimedia data flows further include bidirectional audio (e.g., audio chat), bidirectional VR video, unidirectional audio/video/VR, and other such multimedia data flows.

Multimedia data flows may be bidirectional data flows (e.g., a conversational video between user equipment 140a and user equipment 140b) and/or may involve a plurality of user equipment (e.g., a video conference involving user equipment 140a, user equipment 140b, and user equipment 140c). Such data flows involving multiple user equipment may involve multiple bidirectional data flows between each pair of user equipment (e.g., a first bidirectional data flow between user equipment 140a and user equipment 140b, and second bidirectional data flow between user equipment 140b and user equipment 140c, and a third bidirectional data flow between user equipment 140a and user equipment 140c), or may involve bidirectional data flows between each user equipment and a central server. Bidirectional data flows as described herein may thus occur between user equipment and other endpoints (e.g., servers).

A radio access network (RAN) 150 may include multiple access points 130 that are configured to communicate wirelessly with user equipment 140. The access points may include base stations and/or nodes that enable wireless communications with user equipment 140 according to wireless standards (e.g., 3G, 4G, 5G, or other such wireless standards). Such nodes of the access points 130 may provide scheduler functionality, traffic management functionality, and other RAN resource management functionality.

The RANs 150 may further include network equipment 120 for providing RAN functionality. Such network equipment 120 may implement radio network controller functionality for controlling an access point 130 to communicate with user equipment 140. Additionally or alternatively, the network equipment 120 may include cloud RAN functionality (e.g., functionality of the access point 130 managed in a cloud environment). In some embodiments, some or all functions of the network equipment 120 may be implemented by nodes and/or base stations of the access points 130.

As illustrated in FIG. 1, some user equipment may connect via other access networks 150d that may not be radio access networks. Although the concepts described below are often described with respect to a radio access network, it should be understood that the principles described herein may be used in any type of access network.

Figures 2A, 2B:
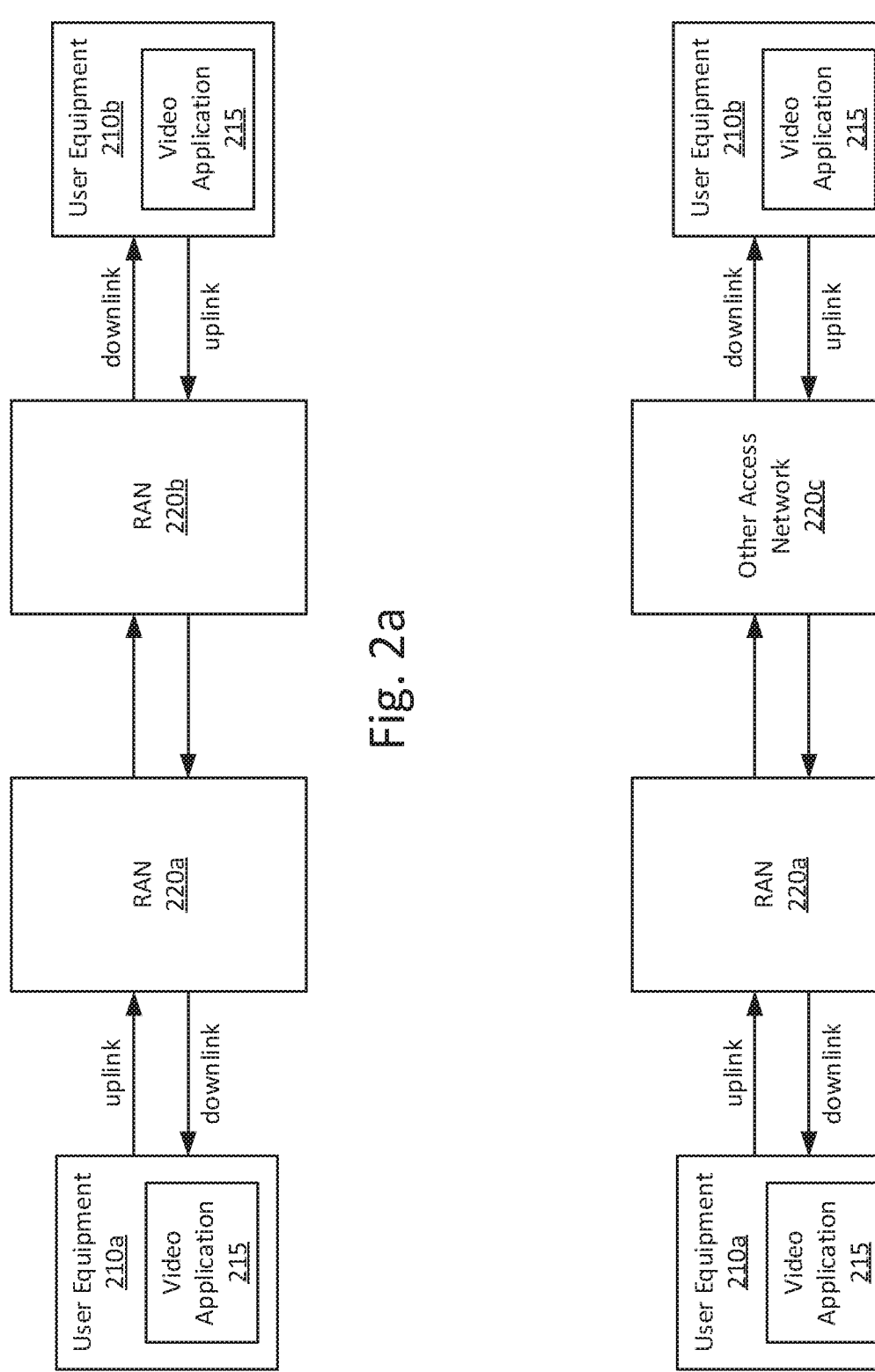
FIGS. 2a and 2b illustrate data flows between user equipment connected to various access networks.

FIG. 2a illustrates an example bidirectional data flow between user equipment 210a and user equipment 210b, which may be examples of user equipment 140 according to FIG. 1. Such a data flow may be, for example, a conversational video session in which user equipment 210a is transmitting video to user equipment 210b, and user equipment 210b is transmitting video to user equipment 210a. The user equipment 210a, 210b may be executing a video application 215 (e.g., SKYPE, FACETIME, etc.) that provides the bidirectional video. In the illustrated example, the two instances of application 215 may send signaling messages to each other to establish and tear down video sessions, communicate regarding video encoding and/or encoding rates, indicate delays or other transmission issues, and the like. Many such bidirectional video applications negotiate between endpoints in order to establish video encoding rates based on delays, bandwidth, lost traffic, and other network issues. Signaling messages between the video applications are often encrypted and thus may be unusable by equipment in a RAN or other access network.

The bidirectional data flow may pass through a first radio access network 220a and a second radio access network 220b, which may be examples of radio access networks 150 of FIG. 1. The bidirectional data flow may also pass through one or more core and/or external networks (e.g., networks 110). Due to varying technologies (e.g., one of the RANs may be part of a 3G network and the other RAN may be part of a 4G network), varying traffic levels at the RANs, varying signal strength for the wireless connections between the user equipment and the RAN, and other factors, one or both of the RANs may act as a bandwidth and/or latency bottleneck for the bidirectional data flow at various times during the data flow session.

The first equipment 210a may transmit data (e.g., video) to the second user equipment 210b by transmitting the video via a uplink of the first RAN 220a. The first RAN 220a may then transmit the video (e.g., via one or more core and/or external networks, which are not illustrated) to a second RAN 220b. The second RAN 220b may then transmit the video to the user equipment 210b via a downlink. Similarly, the second user equipment 210b may transmit data (e.g., video) to the first user equipment 210a by transmitting the video via an uplink of the second RAN 220b. The second RAN 220b may then transmit the video (e.g., via one or more core and/or external networks, which are not illustrated) to the first RAN 220a. The first RAN 220a may then transmit the video to the user equipment 210a via a downlink. Because the uplink and downlink of a particular RAN may experience varying traffic and congestion levels and signal issues, among other issues, the available bandwidth and end-to-end (e2e) delay of traffic in one direction may be different from the available bandwidth and e2e delay in the other direction.

FIG. 2b illustrates a second example bidirectional data flow between user equipment 210a and user equipment 210b, which may be examples of user equipment 140 of FIG. 1. In this example, a bidirectional data flow may have endpoints at user equipment 210a and user equipment 210b, but the second user equipment 210b may be connected to an other access network, which may be an example of an other access network 150d of FIG. 1. Such an other access network may include a cable access network, a fiber access network, or some other type of access network, and may include one or more wired or wireless connections (e.g., a Wi-Fi access point).

In some embodiments, both user equipment 210 of a bidirectional data flow may connect via other access networks (e.g., non-RAN access networks). In some embodiments, more than two user equipment 210 may be endpoints of a data flow among the more than two user equipment (e.g., a three-way video conference). In some embodiments, a bidirectional or other multimedia data flow may occur between a user equipment and a server or other non-user equipment.

Figure 3:
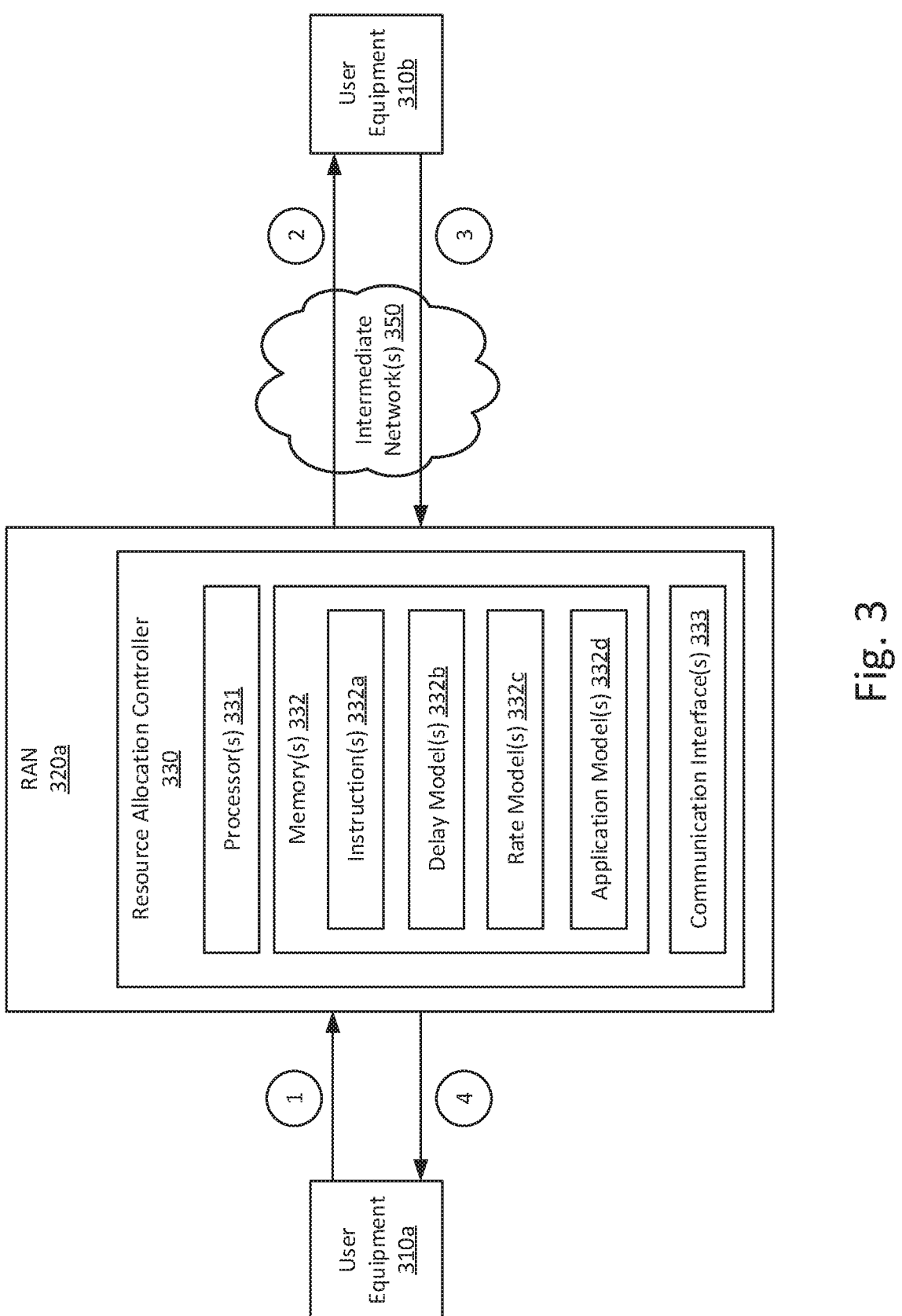
FIG. 3 illustrates components of a radio access network and connections to user equipment.

FIG. 3 illustrates further details of a resource allocation controller 330 of a RAN 320, which may be an example of a RAN 150 of FIG. 1. The resource allocation controller 330 may be implemented by a node and/or a base station of a RAN access point (e.g., an access point 130) and/or may be implemented by network equipment (e.g., network equipment 120) as illustrated at FIG. 1. The RAN 320a may connect to user equipment 310a (which may be an example of user equipment 140, 210) via the wireless network provided by the RAN. The RAN 320a may thus receive data from the user equipment 310a via an uplink data flow and transmit data to the user equipment 310a via a downlink data flow. The RAN 320a may also send and receive data bidirectionally via intermediate networks 350 to and from user equipment 310b. The intermediate networks may include core and/or external networks, (e.g., networks 110) and/or access networks (e.g., RAN 220 or other access network 220c).

The resource allocation controller 330 may manage RAN resources for the user equipment 310a to improve a quality of service of the bidirectional data flow. Because the resource allocation controller 330 manages resources for the RAN 320a, it may manage resources for first and fourth data flows of FIG. 3. The second and third data flows involve other intermediate networks 350 over which the resource allocation controller 330 may have no control. Accordingly, the resource allocation controller may manage the RAN resources to prevent the RAN 320a from becoming a bottleneck in either direction of the bidirectional data flow.

The resource allocation controller 330 may comprise one or more processors 331 and one or more memories 332. The memory(s) may store instructions 332a which, when executed by the processor(s) 331, cause the resource allocation controller 330 to perform functions described herein. For example, the instructions 332a may cause the resource allocation controller 330 to perform the method of FIG. 5, as further described below.

The resource allocation controller may allocate resources for the uplink (e.g., the first data flow) and the downlink (e.g., the fourth data flow) with the user equipment 310a based on a predicted future encoding rate (and/or predicted future throughput) of the uplink data flow and/or the downlink data flow. In order to predict the future encoding rate, the resource allocation controller may use one or more delay model(s) 332b to determine uplink delays associated with both the RAN and with intermediate networks (e.g., associated with the first and second data flows) and to determine downlink delays associated with both the RAN and with intermediate networks (e.g., associated with the third and fourth data flows). The RAN may then calculate an end-to-end delay for both directions of the bidirectional data flow (e.g., by adding the delays associated with the first and second data flows to determine an end-to-end delay for one direction, and adding the delays associated with the third and fourth data flows to determine an end-to-end delay for the other direction).

After determining end-to-end delays for both directions of the bidirectional data flow, the resource allocation controller 330 may use one or more rate model(s) 332c to predict a future encoding rate for multimedia data transmitted in each direction based on the corresponding end-to-end delay. For example, using a first end-to-end delay, the resource allocation controller 330 may calculate, using one of the rate models 332c, a predicted encoding rate for video sent from user equipment 310a to user equipment 310b. The resource allocation controller 330 may also calculate, using the same or a different rate model 332c, a predicted encoding rate for video sent from user equipment 310b to user equipment 310a.

Based on the predicted encoding rates, the resource allocation controller 330 may allocate sufficient RAN resources in order to avoid limiting the bidirectional data flow. The resource allocation controller may thus transmit instructions (e.g., to a node of the RAN 320a that is associated with the user equipment 310a via a communication interface 333) to allocate resources appropriately. A method for allocating resources based on predicted delays and encoding rates is described in more detail below with respect to FIG. 5.

Figure 4A:
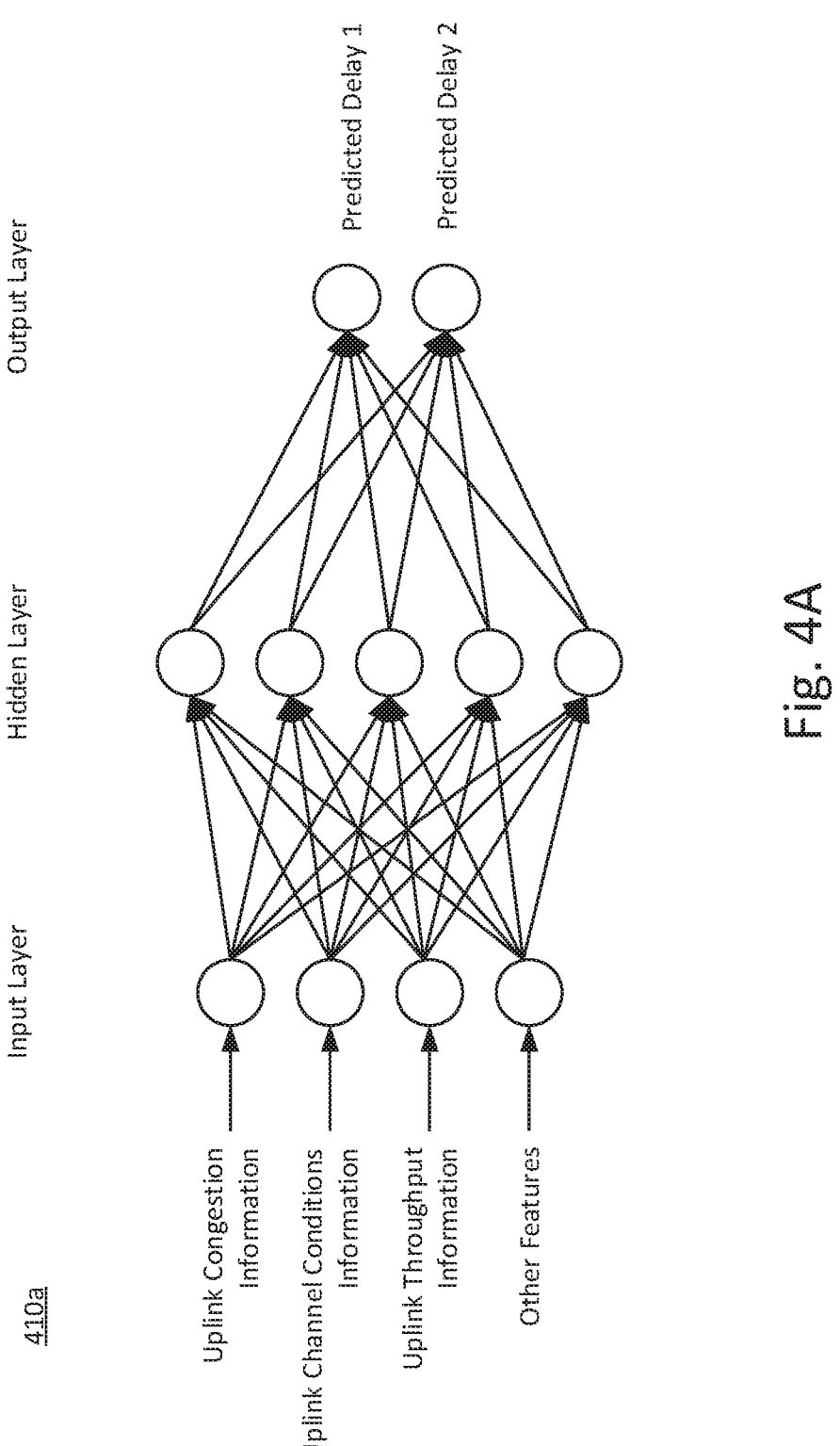
FIGS. 4a, 4b, and 4c illustrate example models for calculating predictions as described herein.

FIG. 4A illustrates a first example model 410a for predicting delays for an uplink data flow. The model 410a may be one of the delay models 332b used to predict delays. The model 410a may be trained to predict a first delay (e.g., a portion of an end-to-end delay associated with the data flow through the RAN 320a) and a second delay (e.g., the remaining portion of the end-to-end delay associated with the data flow through intermediate networks 350 outside the RAN) based on multiple input features. The input features may include network conditions information related to the uplink data flow, such as congestion information for the uplink direction, channel conditions information for uplink channels, and throughput information for the uplink data flow. Other example features may include any information about throughputs and/or latencies for any backhaul links (e.g., core and/or external networks 110).

The uplink congestion information may indicate how congested the RAN uplink is, which may tend to predict delays in the bidirectional data flow. The uplink congestion information input may be determined in various ways. In a 4G/LTE context, congestion information may be indicated in terms of an available number of physical resource blocks (PRBs). Thus, for example, a simple measure of uplink network congestion may be a number and/or percentage of PRBs that are available for uplink traffic. Another congestion measurement may include an average number of PRBs/second for an active bearer, described in U.S. Pat. No. 9,794,825, which is herein incorporated by reference in its entirety. Another congestion measurement may be an average round-trip delay for all users connected to an access point of the RAN. Some or all of these measurements may be used as one or more inputs to the model 410a. In some embodiments (e.g., for non-4G/LTE networks), congestion information may be measured in terms of other types of network resources than PRBs.

The uplink channel conditions information indicates a quality of the wireless uplink connection to the user equipment, which may tend to indicate delays due to lost packets and the like. The uplink channel conditions information may be determined in various ways. A received signal strength indication (RSSI), a reference signals received power (RSRP), a signal to interference plus noise ratio (SINR), and/or other types of noise ratios may be used as indications of conditions on the channel used to connect with the user equipment 310a. Other measurements include an average number of PRBs allocated to each bearer and/or a number of bits per PRB. Some or all of these measurements may be used as one or more inputs to the model 410a.

The uplink throughput information may indicate a current throughput (e.g., in bits per second) associated with the user equipment 310a in the uplink direction, as measured over a recent time period (e.g., the past 10s or 100s of milliseconds or seconds).

The model 410a may be trained to predict both a first delay associated with the RAN uplink and a second delay associated with the remainder of the data flow through various intermediate networks. To train the model 410a, a training data set may be generated from data collected at both a RAN and at user equipment providing bidirectional data flows through the RAN. For example, to generate a training data set for the model 410a, an operator may connect test user equipment wirelessly to the RAN. The operator may then establish a bidirectional data flow with the test user equipment as one end point (e.g., by executing a video application 215 and establishing a conversational video session). The RAN may then log uplink congestion information, uplink channel conditions information, throughput information, and any other information used to provide input features to the model 410*a*. Simultaneously, the test user equipment may log end-to-end delays (e.g., as indicated by data generated by and collected from the video application 215 executing on the test user equipment, and/or from signaling messages received from the video application 215 executing on user equipment at the other endpoint of the bidirectional data flows). Additionally, the test equipment and/or the RAN may log first delays associated with the RAN uplink by configuring the test equipment and/or the RAN to provide signaling to measure such delays. From the end-to-end delay data and the first delay data associated with the RAN uplink, second delay data associated with the remainder of the data flow through various intermediate data networks may be generated (e.g., by subtracting the first delay from the end-to-end delay). In other examples, instead of outputting first and second delays, the model 410*a* may be trained to output a single (e.g., end-to-end) delay.

The operator may then correlate and compile the logged data to form a training data set. The first and second delay data may be set as the target variables, and the input data may be used as the input features. The model may be trained using various machine learning and/or statistical techniques (e.g., gradient descent, backpropagation, etc.) to develop a trained model. The training process may adjust the weights assigned to the nodes of each layer in order to map the input features to the target outputs. The training process may map the input features to delay measurements associated with later times (e.g., 10s or 100s of milliseconds later, for example) in relation to the times associated with the input features such that the model is trained to predict future delays (e.g., 10s or 100s of milliseconds in the future, for example) based on the input features.

Although FIG. 4*a* shows a simple neural network, other variations and/or types of models may be used. For example, although FIG. 4*a* illustrates a single hidden layer with five nodes, in other examples additional hidden layers may be used. For example, deep neural networks may use large numbers of hidden layers. Additionally or alternatively, various numbers of nodes may be used for different hidden layers. Additionally or alternatively, as described above, the model 410*a* may use less or more than the illustrated four inputs.

In some embodiments, rather than calculating specific features for inputs, some or all of the inputs may be raw or lightly processed data. For example, instead of calculating network congestion information, a raw or lightly-processed (e.g., re-formatted) feed of traffic and/or a data structure used by a network scheduler may be provided as input(s) to the model 410*a*. Deep neural networks and other deep learning techniques may be particularly suited to making predictions based on this type of more complex input data.

Figure 4B:
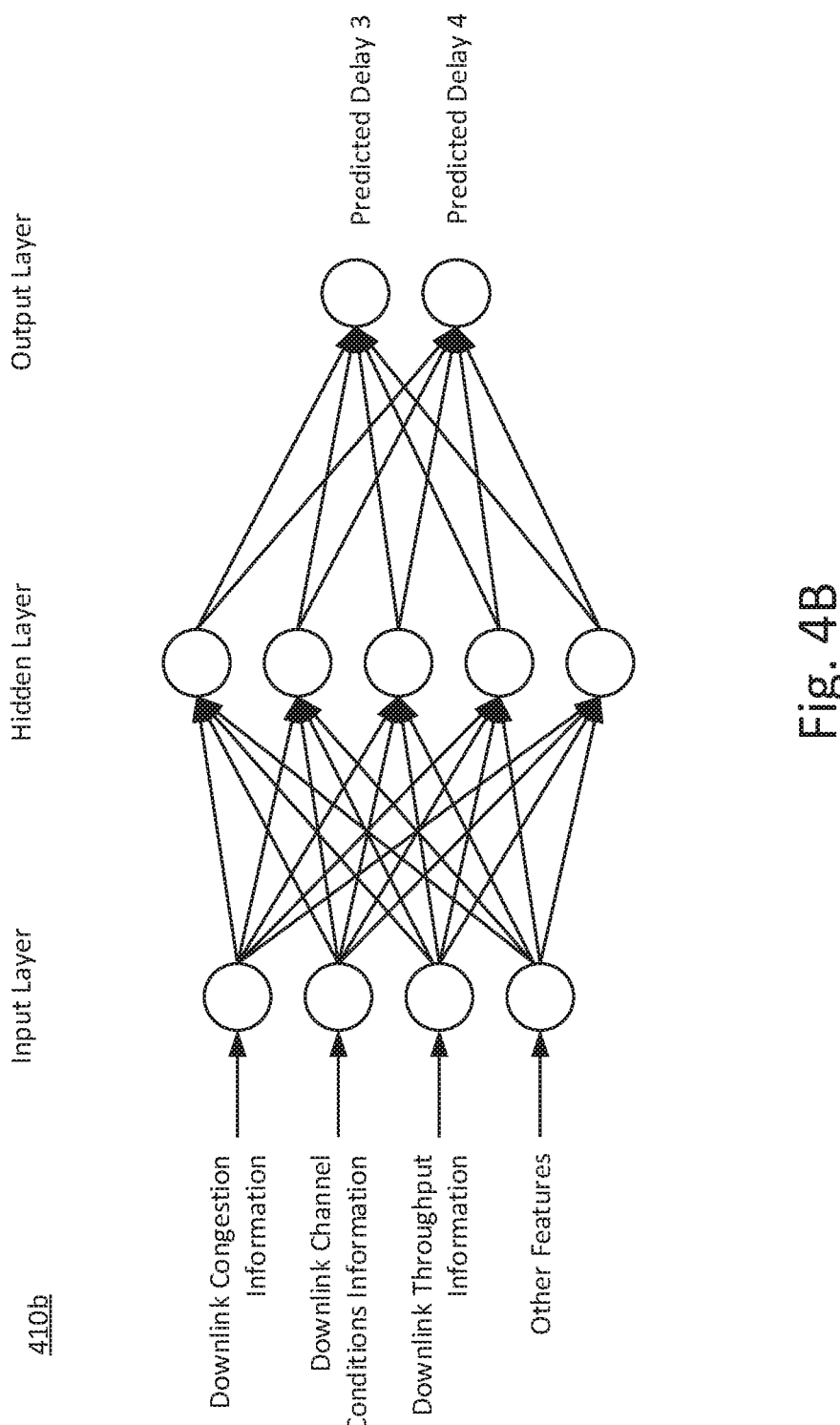

FIG. 4B illustrates a second example model 410*b* for predicting delays for a downlink data flow. The model 410*b* may be one of the delay models 332*b* used to predict delays. The model 410*b* may be trained to predict a third delay (e.g., a portion of the end-to-end delay associated with the data flow through intermediate networks 350 outside the RAN) and a fourth delay (e.g., a portion of an end-to-end delay associated with the data flow through the RAN 320*a*) based on multiple input features. The input features may include network conditions information related to the downlink data flow, such as congestion information for the downlink direction, channel conditions information for downlink channels, throughput information for the downlink data flow, and other example input features as discussed above for model 410*a*. The congestion information, channel conditions information, and throughput information related to the downlink data flow may be determined as discussed above for model 410*a*.

The training data set for the model 410*b* may be compiled, and the model 410*b* trained, similarly as for the model 410*a* discussed above. Similarly, the example model 410*b* may be varied to include different numbers of layers and/or nodes, or to use different models besides neural networks, such as other machine learning models. Additionally or alternatively, the model 410*b* may be a deep neural network. Additionally or alternatively, the model 410*b* may receive varying number of inputs and/or may receive raw or lightly processed (e.g., re-formatted) data as an input, such as a raw or lightly processed feed of traffic and/or a data structure used by a network scheduler.

Figure 4C:
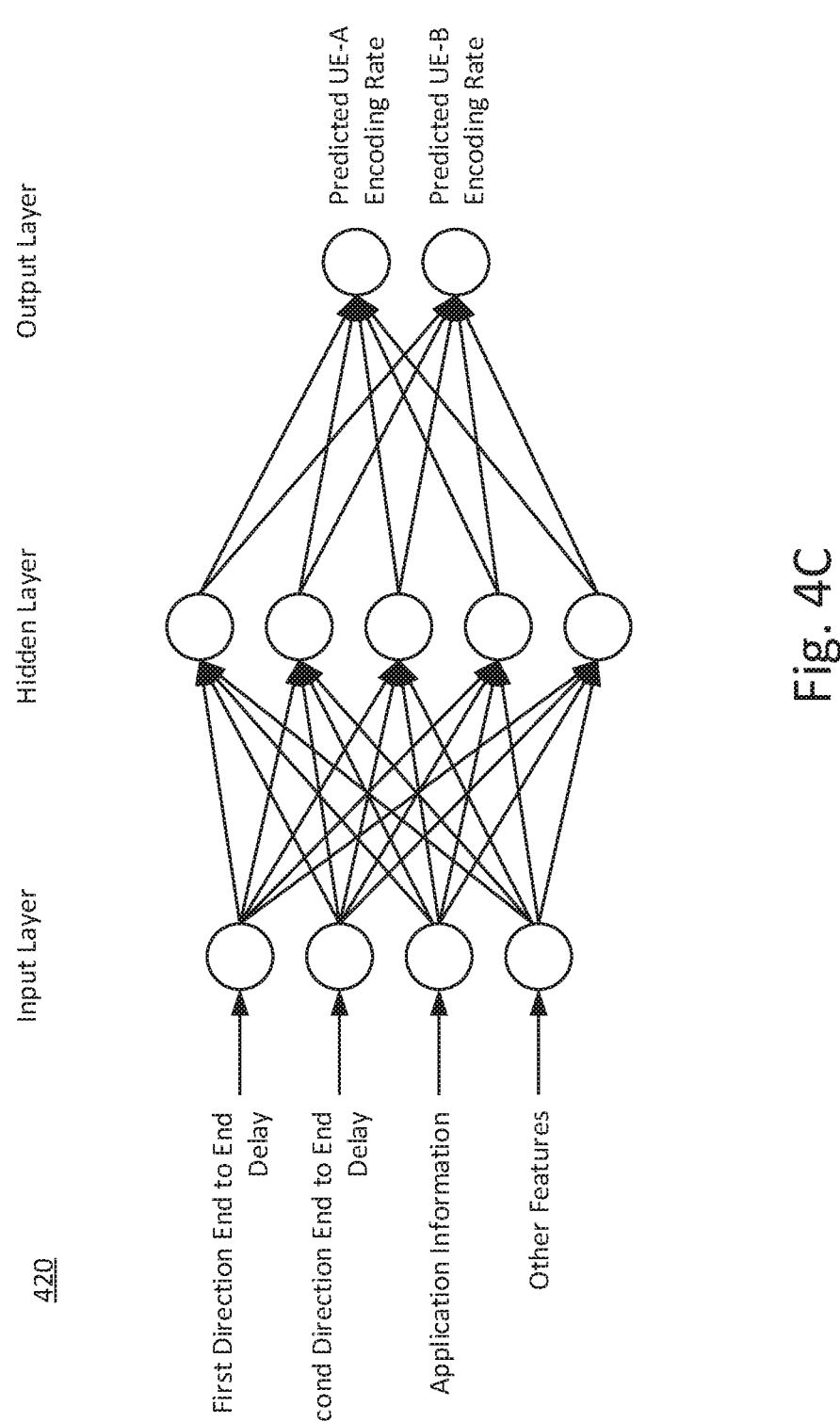

FIG. 4C illustrates a third example model 420. The model 420 may one of the rate models 332*c* used to predict encoding rates based on delays. The model 420 may be trained to predict an encoding rate for a first user equipment (e.g., user equipment 310*a* at one end of a bidirectional data flow) and an encoding rate for a second user equipment (e.g., user equipment 310*b* at the other end of a bidirectional data flow) based on multiple input features. The input features may include end-to-end delay for a first direction of the bidirectional data flow, end-to-end delay for a second direction of the bidirectional data flow, application information, and other example input features. Such other example input features may include end-to-end delays for other user equipment in communication with the RAN (e.g., besides the user equipment 310*a* and the user equipment 310*b*).

End-to-end delays may influence the encoding rate selected by an application for establishing the bidirectional data flow (e.g., video application 215). For example, the video application, upon encountering certain amounts of delay, may tend to reduce an encoding rate in order to prevent packet loss or delay that may cause video hiccups and other such quality issues. The end-to-end delays may be derived arithmetically from the outputs of the delays models 332*b*, 410. For example, first and second delays may be added together to yield the first end-to-end delay for the first direction. Similarly, third and fourth delays may be added together to yield the second end-to-end delay for the second direction.

Application information may indicate a determination of the specific application (e.g., SKYPE, FACETIME, WECHAT, etc.) or type of application (e.g., what video protocols and/or standards are used by the application). The application information may provide information about predicted encoding rates. For example, some applications may rapidly reduce encoding rates upon encountering certain delays and/or rapidly increase encoding rates in the absence of delays, whereas other applications may more slowly reduce or increase encoding rates under the same conditions.

The model 420 may be trained to predict both a first encoding rate associated with first user equipment and a second encoding rate associated with second user equipment. To train the model 420, a training data set may be generated from data collected at both a RAN and at user equipment providing bidirectional data flows through the RAN. For example, to generate a training data set for the model 420, an operator may connect test user equipment wirelessly to the RAN. The operator may then establish a bidirectional data flow with the test user equipment as one end point (e.g., by executing a video application 215 and establishing a conversational video session). The test user equipment may then log end-to-end delays in both directions (e.g., as indicated by data generated by and collected from the video application 215 executing on the test user equipment, and/or from signaling messages received from the video application 215 executing on user equipment at the other end of the bidirectional data flow). Additionally, the test equipment may log application information such as the application or application type. Simultaneously, the test user equipment may log encoding rates for both the test user equipment and the user equipment at the other end of the bidirectional data flow (e.g., as indicated by data generated by and collected from the video application 215 executing on the test user equipment, and/or from signaling messages received from the video application 215 executing on user equipment at the other end of the bidirectional data flow). In some embodiments, the training data for training the model 420 may be collected at the same time as the training data for training the models 410a, 410b (e.g., using the same bidirectional data flow established by the same test user equipment). Thus, the training data set for training the model 420 may be the same training data set used to train the models 410a, 410b (e.g., as a single data set containing correlated training information for the plurality of models).

For training the model 420, the encoding rates for both endpoints may be set as the target variables, and the first and second delay data, the application information, and any other features may be used as the input features. The model may be trained using various machine learning and/or statistical techniques (e.g., gradient descent, backpropagation, etc.) to develop a trained model. The training process may adjust the weights assigned to the nodes of each layer in order to map the input features to the target outputs. The training process may map the input features to encoding rates associated with later times (e.g., 10s or 100s of milliseconds later, for example) in relation to the times associated with the input features such that the model is trained to predict future encoding rates (e.g., 10s or 100s of milliseconds in the future, for example) based on the input features.

In some embodiments, instead of using a single model 420 that outputs encoding rates for both a first user equipment and a second user equipment, one model 332c may be trained to predict an encoding rate for one user equipment (e.g., the user equipment 310a connected wirelessly to the RAN 320a), and a second model 332c may be trained to predict an encoding rate for another user equipment (e.g., the user equipment 310b connected via intermediate networks 350 to the RAN 320a). Accordingly, the models 332c may each receive a single end-to-end delay input. The model 332c for predicting an encoding rate for the user equipment connected wirelessly to the RAN may receive, as an input feature, an end-to-end delay associated with traffic in the uplink direction with respect to the RAN (e.g., an end-to-end delay calculated by adding first and second delays). The model 332c for predicting an encoding rate for the user equipment connected via intermediate networks to the RAN may take, as an input feature, an end-to-end delay associated with traffic in the downlink direction with respect to the RAN (e.g., an end-to-end delay calculated by adding third and fourth delays).

In some embodiments, in addition to or as an alternative to using machine learning techniques, neural networks, or the like, statistical models such as regression models may be trained and used. In some embodiments, instead of using one or more models 332b, 332c, a lookup table may be used. For example, as an alternative to model(s) 420, 332c for predicting encoding rates, one or more lookup tables containing predicted encoding rates based on end-to-end delays may be used. Such a lookup table may contain different data for different applications such that the encoding rate predictions may be application-specific.

Figure 5:
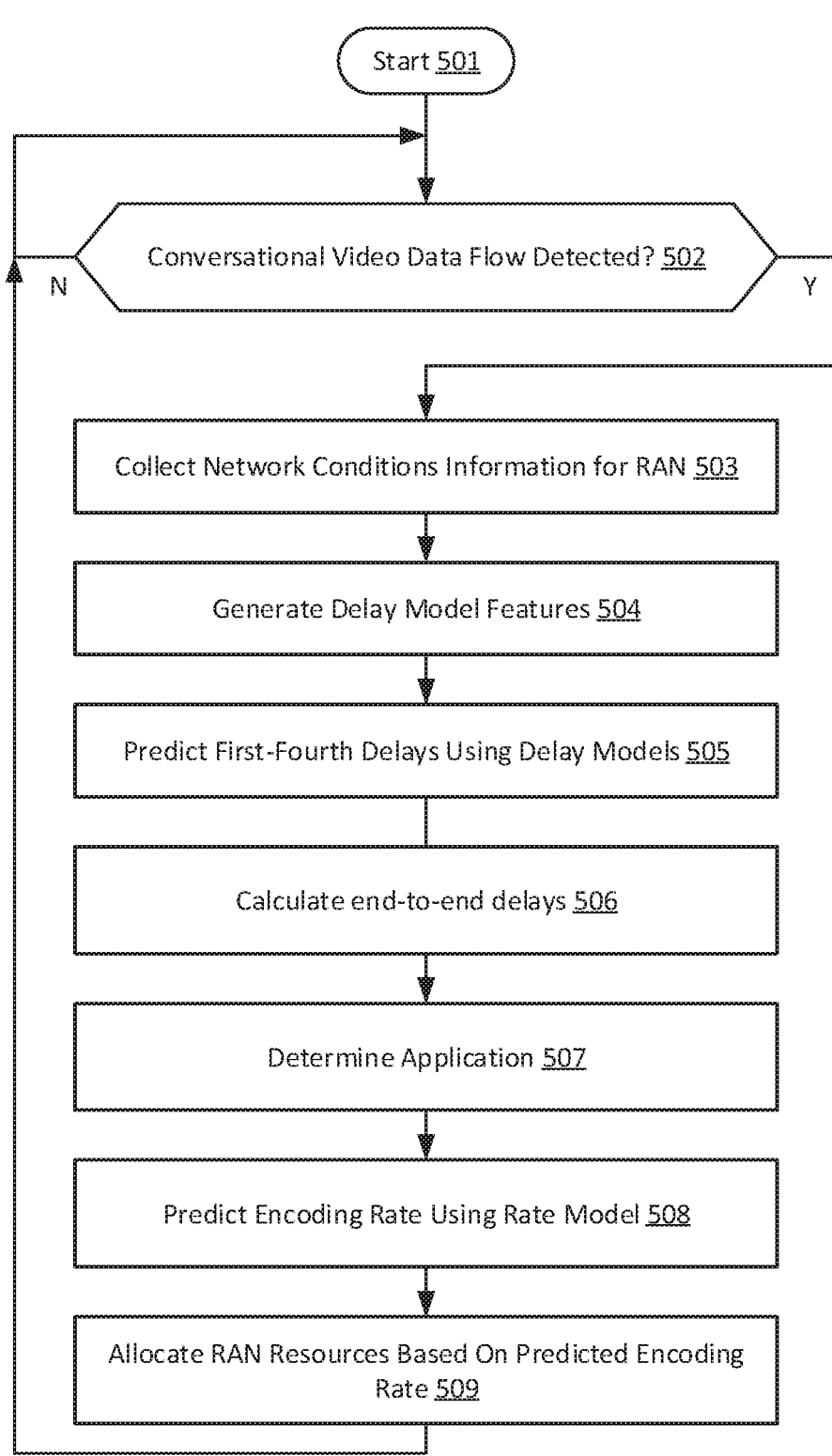
FIG. 5 illustrates a method for allocating network resources.

FIG. 5 illustrates a method for allocating RAN resources to bidirectional data flows (e.g., conversational video) based on predicted encoding rates. The method of FIG. 5 may be executed by the resource allocation controller 330, which may be implemented by a node and/or base station of RAN access points 130 and/or by RAN network equipment 120.

The process may begin at step 501. The process may begin when equipment is brought online and may run continuously or periodically (e.g., continuously or periodically executing in a loop) and/or may begin when a new data flow is detected by the resource allocation controller 330. At step 502, the resource allocation controller 330 may test a data flow to determine whether it contains latency-sensitive bidirectional data flows. As illustrated, the resource allocation controller 330 may determine whether the traffic is associated with conversational video specifically. The resource allocation controller 330 may determine the application type (e.g., whether the application type is conversational video or some other latency-sensitive data flow) based on statistics vectors of bearer metrics and locating points on a label map corresponding to the statistics vectors, as described in U.S. Pat. No. 9,780,997, which is hereby incorporated by reference in its entirety. If the resource allocation controller 330 determines that the application type is not conversational video (and/or some other type of latency-sensitive multimedia data flow), it may loop back and repeat the test on the same data flow and/or another data flow. The resource allocation controller 330 may perform step 502 again (e.g., on the same data flow or another data flow) after waiting for some time (e.g., after a delay step, not illustrated) in order to conserve computational resources. If the resource allocation controller 330 determines that the data flow is conversational video (and/or some other type of latency-sensitive multimedia data flow), it proceeds to step 503.

In some embodiments, in addition to or as an alternative to using statistics vectors to determine an application type, the resource allocation controller 330 may use an application model 332d trained to identify an application and/or an application type. The model 332d may take, as input, a traffic flow and, based on the traffic, predict an application or application type that generated the traffic. Additionally or alternatively, the model 332d may take, as input, statistics and/or other information derived from the traffic flow. The model 332d may be a deep neural network trained using a training data set consisting of example traffic flows and/or information (e.g., statistics) derived from the traffic flows as inputs and indications of which application and/or application type generated the corresponding traffic flow as a target variable. Such a model may be trained using any of the techniques described above, including machine learning and/or statistical modeling techniques (e.g., neural networks, deep learning, regression models, and/or the like).

At step 503, the resource allocation controller 330 may collect network conditions information for the RAN. The resource allocation controller 330 may thus collect data used to generate input features for the delay models 332b (e.g., models 410a, 410b). Such network conditions information may include one or more of uplink and/or downlink congestion information, uplink and/or downlink channel congestion information, uplink and/or downlink throughput information, and any other network conditions features for inputting into delay models 332b (e.g., models 410a, 410b).

The resource allocation controller 330 may collect such information from other components of the RAN (e.g., from nodes and/or base stations of the access points 130 and/or network equipment 120) by requesting the information from such components (e.g., by transmitting one or more requests to the components via communication interfaces 333) and/or may receive such information continuously, periodically, or at some other interval. Additionally or alternatively, the resource allocation controller 330 may generate and/or calculate such network conditions information itself (e.g., based on other information previously obtained and/or stored by the resource allocation controller 330).

At step 504, resource allocation controller 330 may process the network conditions information to generate the input features for the delay model(s) 332*b* (e.g., models 410*a*, 410*b*). Such processing may involve normalizing, correlating, structuring or otherwise modifying the format of the data into a format suitable for input into the delay model(s) 332*b* (e.g., models 410*a*, 410*b*). The delay model features may include any of the input features discussed above.

At step 505, the resource allocation controller 330 may use the one or more delay model(s) 332*b* to predict delays (e.g., first through fourth delays associated respectively with a uplink connection with a first user equipment via the RAN, an uplink connection with a second user equipment, a downlink connection with the second user equipment, and a downlink connection with the first user equipment via the RAN). The resource allocation controller 330 may thus input the delay model features to the delay models 332*b* in order to generate the predicted delays. The predicted delays may indicate delays in the near future (e.g., in the next 10s or 100s of milliseconds) based on the input features.

At step 506, the resource allocation controller 330 may calculate end-to-end delays for both directions of the bidirectional data flow. The resource allocation controller 330 may, for example, add the first and second delays to yield the first end-to-end delay, and add the third and fourth delays to yield the second end-to-end delay. In other examples, the delay model(s) 332*b* may predict end-to-end delays and thus step 506 may not be necessary.

At step 507, the resource allocation controller 330 may determine an application associated with the bidirectional data flow. In some embodiments, the process for detecting conversational video (e.g., for step 502) may indicate an application, as discussed above. In such cases, the resource allocation controller 330 may look up and/or retrieve the previously determined application. In some embodiments, the resource allocation controller 330 may use an application model 332*d* to determine the application, as discussed above. Thus, the resource allocation controller 330 may retrieve the application determination if the resource allocation controller 330 previously determined the application using the application model 332*d*, and/or use the application model 332*d* at step 507 to determine the application based on the traffic flow and/or information derived from the traffic flow (e.g., statistics or other metrics).

At step 508, the resource allocation controller 330 may predict encoding rates for the bidirectional data flow using the model(s) 332*c*. Accordingly, the resource allocation controller 330 may provide the end-to-end delays, the application information, and/or any other input features for the model(s) 332*c* in order to predict the encoding rates. In some embodiments, instead of model(s) 332*c*, the resource allocation controller 330 may use one or more lookup tables to predict the encoding rates based on the end-to-end delays. In such embodiments, the resource allocation controller 330 may look up the encoding rate information using one or more queries containing the end-to-end delay(s). In some embodiments, multiple lookup tables may be provided for various applications and/or application types. Accordingly, the resource allocation controller 330 may provide the determined application and/or application type in the one or more lookup table queries. The resource allocation controller 330 may thus determine predicted encoding rates for one or both user equipment of the bidirectional data flow.

At step 509, the resource allocation controller 330 may allocate RAN resources based on the predicted encoding rate, the current allocation of resources on the RAN, and/or the current uplink and downlink delay(s) associated with the wireless connection(s) between the first user equipment 310*a* and the RAN.

In some cases, to allocate RAN resources, the resource allocation controller 330 may calculate an uplink throughput and/or a downlink throughput based on the predicted encoding rate(s). The RAN may then ensure that sufficient resources are allocated to the user equipment 310*a* wirelessly connected to the RAN in order to accommodate the determined throughput. If insufficient resources are allocated to the user equipment 310*a*, the RAN may increase the resources allocated to the user equipment 310*a* (e.g., by assigning more PRBs to the user equipment 310*a*). In some cases, the RAN may re-allocate resources (e.g., PRBs) allocated to other devices (e.g., other user equipment wirelessly connected to the RAN) that are not associated with latency-sensitive data flows (e.g., conversational video data flows) to the user equipment 310.

In some cases, the resource allocation controller 330 may determine that too many resources are allocated to the user equipment 310*a* based on the predicted encoding rate. If the RAN has resources to spare (e.g., if other user equipment connected wirelessly to the RAN does not need additional resources for latency-sensitive traffic), it may leave the extra resources allocated to the user equipment in case the encoding rate of the bidirectional data flow later increases. If other user equipment needs resources (e.g., if the resource allocation controller 330 determines, by executing the process of FIG. 5 in parallel for a second bidirectional data flow, or from a previous iteration through the loop of the process of FIG. 5 that related to the second bidirectional data flow, that the second bidirectional data flow has insufficient resources allocated), the resource allocation controller 330 may allocate the extra resources (e.g., PRBs) from the user equipment 310 to the other user equipment.

In some cases, the resource allocation controller 330 may determine, based on the current uplink and downlink delay(s) associated with the wireless connection(s) between the first user equipment 310*a* and the RAN, that the RAN is not the bottleneck even when the bidirectional data flow has insufficient resources. Therefore, the resource allocation controller 330 may, in some cases, deprioritize (e.g., in favor of another user equipment that also needs additional resources) user equipment 310*a* participating in latency-sensitive bidirectional data flows even when the bidirectional data flow has insufficient resources, because the resource allocation controller 330 determines that the RAN is not the bottleneck for traffic (e.g., because the intermediate networks 350 are delaying traffic). Therefore, in some cases the resource allocation controller 330 may determine that allocating additional resources will not improve a quality of service for a bidirectional data flow because intermediate networks 350 over which the resource allocation controller 330 may not have control are preventing better quality of service.

Figure 6:
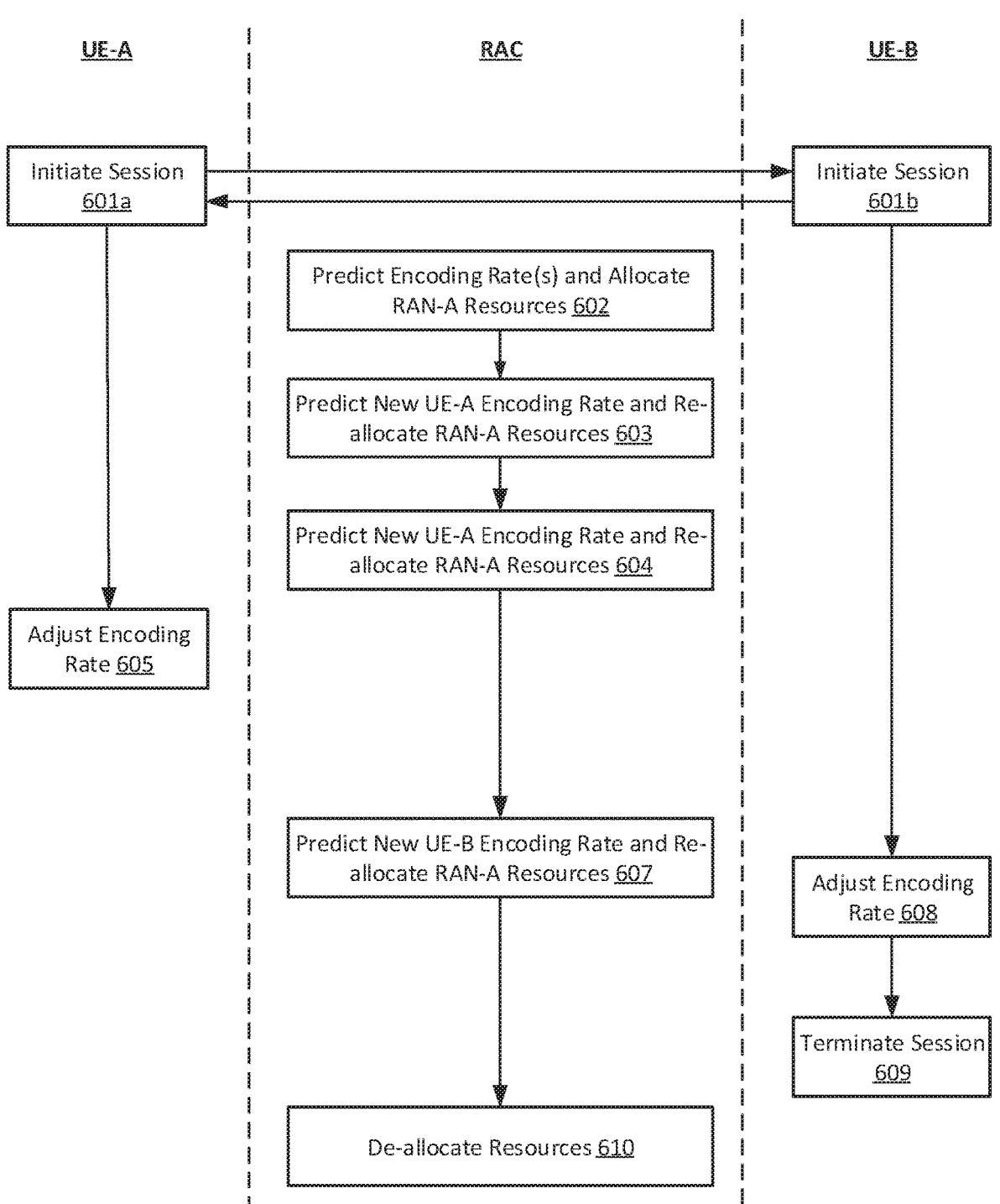
FIG. 6 illustrates an example of resource allocation during an example multimedia data session.

FIG. 6 illustrates an example of resource allocation during an example multimedia data session. The illustrated example begins at steps 601*a*, 601*b*, in which the two user equipment A, B (which may be examples of user equipment 140, 210, 310) establish a session. For example, a video application running on both of user equipment A and user equipment B may negotiate, perform handshake operations, and otherwise signal each other to set up a conversational video session. The session may be encrypted, which means equipment of RAN-A may be unable to observe the type of traffic, what signals are being exchanged, or otherwise extract information directly from the traffic.

At step 602, equipment of the RAN (e.g., the resource allocation controller 330) may execute steps 503-509 of the process of FIG. 5 (e.g., after determining that the initiated session is a conversational video session in step 502 of the process of FIG. 5). The resource allocation controller 330 may thus allocate sufficient resources based on the predicted encoding rates of both the user equipment A and the user equipment B.

At step 603, after repeatedly looping through the process of FIG. 5, the resource allocation controller 330 may determine a new predicted encoding rate (e.g., for user equipment A, as illustrated, or for either or both of user equipment A and/or user equipment B). The predicted encoding rate may vary over time due to changes in network conditions information (e.g., channel uplink and/or downlink congestion, uplink and/or downlink channel quality, changes in uplink and/or downlink throughput, and the like). Such changes may occur because of other user equipment joining and/or leaving the RAN and/or using varying amounts of traffic bandwidth, due to movement of user equipment A and/or B causing varying channel conditions on either end of the bidirectional data flow, due to changes in encoding at either user equipment A or user equipment B, or for other reasons. In response to determining a new predicted encoding rate, the resource allocation controller 330 may re-allocate resources to the uplink and/or downlink of the RAN connection to user equipment A.

In some cases, as illustrated by FIG. 6, re-allocating resources may prevent the user equipment A and/or user equipment B from having to adjust an encoding rate. Therefore, even though the resource allocation controller predicted a new encoding rate for at least one of the user equipment A and/or user equipment B, the user equipment A and/or user equipment B may not actually change their encoding rate. For example, if the resource allocation controller 330 predicts a lower encoding rate at step 603 for user equipment A in comparison to the predicted encoding rate for user equipment A at step 602, the resource allocation controller may respond by increasing resources for the uplink connection with user equipment A so that the user equipment A does not need to lower its encoding rate. Therefore, predicting encoding rate changes and adjusting resources ahead of time may actually prevent the necessity of the encoding rate changes.

In other cases, the predicted encoding rate changes may occur. For example, the resource allocation controller 330 may predict a new encoding rate for user equipment A at step 604, and the user equipment A may independently adjust its encoding rate at step 605. In these cases, the resource allocation controller 330 may be ready for the new encoding rate by having adjusted the resource allocation ahead of time. For example, when the new encoding rate is higher than the previous encoding rate, the resource allocation controller 330 may be ready to deal with the increased traffic from the higher-rate data flow before the traffic increases.

Similarly, the resource allocation controller 330 may predict encoding rate changes for the user equipment B, as illustrated at step 607, and adjust the resource allocation appropriately. In some cases, the encoding rate change may be avoided by such a re-allocation. In other cases (e.g., as illustrated) the user equipment B may independently adjust its encoding rate.

At some point, one or both of the user equipment A and/or user equipment B may terminate the session. In the illustrated example, user equipment B may terminate the session at step 609. Later, in step 610, the resource allocation controller 330 may determine that the data flow has terminated and de-allocate resources that were previously allocated to the data flow.

Thus, as shown by the example of FIG. 6, the resource allocation controller 330 may be able to optimize resource allocation to improve quality of services for latency-sensitive bidirectional data flows without requiring signaling to and from the user equipment A and/or user equipment B and/or the video applications running on the user equipment A and B.

One or more aspects of the disclosure may be stored as computer-usable data and/or computer-executable instructions, such as in one or more program modules, executed by one or more computers or other devices. Program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, and/or other types of media. The functionality of the program modules may be combined or distributed as desired. Additionally or alternatively, the functionality may be implemented in whole or in part in firmware or hardware equivalents such as integrated circuits, field programmable gate arrays (FPGA), application-specific integrated circuits (ASIC), and/or other types of hardware and/or firmware. Particular data structures may be used to implement one or more operations disclosed herein, and such data structures are contemplated within the scope of computer executable instructions and computer-usable data described herein.

Modifications to the disclosed methods, apparatuses, and systems may be made by those skilled in the art, particularly in light of the foregoing teachings. The features disclosed herein may be utilized alone or in combination or sub-combination with other features. Any of the above described systems, apparatuses, and methods or parts thereof may be combined with the other described systems, apparatuses, and methods or parts thereof. The steps shown in the figures may be performed in other than the recited order, and one or more steps may be optional. It will also be appreciated and understood that modifications may be made without departing from the true spirit and scope of the present disclosure.

What is claimed is:

1. A method comprising: detecting that a data flow is associated with bidirectional video; determining, based on radio access network conditions, at least one predicted delay associated with the data flow, the at least one predicted delay comprising at least one of an uplink delay or a downlink delay; determining, based on the at least one predicted delay, and using a model configured to output predicted encoding rates based on application information or a lookup table including application-specific predicted encoding rates, at least one predicted encoding rate associated with the bidirectional video, wherein the determining of the at least one predicted encoding rate is further based on a predicted application that generates the data flow; and allocating radio access network resources to the data flow based on the at least one predicted encoding rate.

2. The method of claim 1, wherein the radio access network conditions comprises information indicating congestion.

3. The method of claim 2, wherein the information indicating the congestion comprises at least an available number of physical resource blocks per second for a bearer.

4. The method of claim 1, wherein the radio access network conditions comprises information indicating at least one channel condition.

5. The method of claim 1, wherein the radio access network conditions comprises information indicating throughput for the data flow.

6. The method of claim 1, wherein the at least one predicted delay includes a first end-to-end delay for a first direction of the data flow and a second end-to-end delay for a second direction of the data flow.

7. The method of claim 1, wherein the at least one predicted encoding rate comprises a first predicted encoding rate for an application executing on a first user equipment and a second predicted encoding rate for the application running on a second user equipment.

8. A radio access network equipment comprising: one or more processors; and memory storing instructions that, when executed by the one or more processors, cause the radio access network equipment to: detect that a data flow is associated with bidirectional video; determine, based on radio access network conditions, at least one predicted delay associated with the data flow, the at least one predicted delay comprising at least one of an uplink delay or a downlink delay; determine, based on the at least one predicted delay, and using a model configured to output predicted encoding rates based on application information or a lookup table including application-specific predicted encoding rates, at least one predicted encoding rate associated with the bidirectional video, wherein the determining of the at least one predicted encoding rate is further based on a predicted application that generates the data flow; and allocate radio access network resources to the data flow based on the at least one predicted encoding rate.

9. The radio access network equipment of claim 8, wherein the radio access network conditions comprises information indicating congestion.

10. The radio access network equipment of claim 9, wherein the information indicating the congestion comprises an available number of physical resource blocks per second for a bearer.

11. The radio access network equipment of claim 8, wherein the radio access network conditions comprises information indicating at least one channel condition.

12. The radio access network equipment of claim 8, wherein the radio access network conditions comprises information indicating throughput for the data flow.

13. The radio access network equipment of claim 8, wherein the at least one predicted delay includes a first end-to-end delay for a first direction of the data flow and a second end-to-end delay for a second direction of the data flow.

14. The radio access network equipment of claim 8, wherein the at least one predicted encoding rate comprises a first predicted encoding rate for an application running on a first user equipment and a second predicted encoding rate for the application running on a second user equipment.

15. One or more non-transitory computer readable media containing instructions that, when executed by one or more processors of radio access network equipment, cause the radio access network equipment to: detect that a data flow is associated with bidirectional video; determine, based on radio access network conditions, at least one predicted delay associated with the data flow, the at least one predicted delay comprising at least one of an uplink delay or a downlink delay; determine, based on the at least one predicted delay, and using a model configured to output predicted encoding rates based on application information or a lookup table including application-specific predicted encoding rates, at least one predicted encoding rate associated with the bidirectional video, wherein the determining of the at least one predicted encoding rate is further based on a predicted application that generates the data flow; and allocate radio access network resources to the data flow based on the at least one predicted encoding rate.

* * * * *